(12) United States Patent
Grande

(10) Patent No.: US 9,844,176 B2
(45) Date of Patent: Dec. 19, 2017

(54) WEED TRIMMER EXTENSION DEVICE

(71) Applicant: Charles Raphael Grande, Penn Valley, CA (US)

(72) Inventor: Charles Raphael Grande, Penn Valley, CA (US)

(73) Assignee: FOURNIER AND GRANDE TRUST, Penn Valley, CA (US), DATED AUGUST 2, 2005

( * ) Notice: Subject to any disclaimer, the term of this patent is extended or adjusted under 35 U.S.C. 154(b) by 42 days.

(21) Appl. No.: 14/705,162

(22) Filed: May 6, 2015

(65) Prior Publication Data

US 2015/0230402 A1 Aug. 20, 2015

Related U.S. Application Data

(63) Continuation-in-part of application No. 14/160,466, filed on Jan. 21, 2014, now abandoned, which is a continuation-in-part of application No. 14/058,278, filed on Oct. 20, 2013, now abandoned.

(60) Provisional application No. 62/020,298, filed on Jul. 2, 2014, provisional application No. 61/795,665, filed on Oct. 22, 2012.

(51) Int. Cl.
*A01D 34/71* (2006.01)
*A01D 34/416* (2006.01)

(52) U.S. Cl.
CPC ......... *A01D 34/71* (2013.01); *A01D 34/4167* (2013.01)

(58) Field of Classification Search
CPC ................ A01D 34/412; A01D 34/416; A01D 34/4167; A01D 34/71; B23D 59/006; B23Q 11/0046; B23Q 11/0071
USPC .................. 30/124, 276; 56/12.7, 17; D8/8; D15/10
See application file for complete search history.

(56) References Cited

U.S. PATENT DOCUMENTS

| | | | | | |
|---|---|---|---|---|---|
| 3,087,298 | A | * | 4/1963 | Phillips, Sr. ........... | A01D 34/73 56/295 |
| 3,340,682 | A | * | 9/1967 | Ely ........................ | A01D 34/73 56/295 |
| 3,538,692 | A | * | 11/1970 | Cope ..................... | A01D 34/005 56/295 |
| 3,998,037 | A | * | 12/1976 | Deans ................... | A01D 34/005 56/295 |
| 4,242,794 | A | * | 1/1981 | Peterson ............... | E01H 1/0809 30/276 |
| 4,257,214 | A | * | 3/1981 | Ferguson ............... | A01D 34/73 56/13.4 |

(Continued)

*Primary Examiner* — Jason Daniel Prone
(74) *Attorney, Agent, or Firm* — IDP Patent Services; Olav M. Underdal

(57) ABSTRACT

A weed trimmer extension device for cutting and collecting, or dispersing weeds includes a cutting enclosure, to which can be attached a collecting bag or a cutting disperser; a replacement cutting implement; and enclosure fasteners, for attaching the weed trimmer extension device to a weed trimmer. The cutting implement can further include a cutting blade and a perpendicular fin, which pushes air in a circular direction of motion, thereby creating a vortex of air, which rotates in the plane spanned out by the rotating cutting blade. The cutting enclosure covers the replacement cutting implement, which propels the cuttings, contained and directed by the cutting enclosure, into either the collecting bag or the cutting disperser, which disperses the weed cuttings over an area to the side.

19 Claims, 18 Drawing Sheets

(56) References Cited

U.S. PATENT DOCUMENTS

| | | | | |
|---|---|---|---|---|
| 4,269,020 A | * | 5/1981 | Wolf | A01D 34/73 56/295 |
| 4,281,457 A | * | 8/1981 | Walton, II | A61F 15/02 30/124 |
| 4,297,831 A | * | 11/1981 | Pioch | A01D 34/826 56/295 |
| 4,320,617 A | * | 3/1982 | Fedeli | A01D 34/73 56/295 |
| 4,328,661 A | * | 5/1982 | Ferguson | A01D 34/71 56/13.4 |
| 4,429,518 A | * | 2/1984 | Fedeli | A01D 34/73 56/295 |
| 4,450,673 A | * | 5/1984 | Hutchison | A01D 34/005 56/13.4 |
| 4,641,431 A | * | 2/1987 | Leming | A01G 3/0535 30/276 |
| 4,722,139 A | * | 2/1988 | Mahler | A01D 43/06 30/276 |
| 4,987,681 A | * | 1/1991 | Sepke | A01D 34/90 D8/8 |
| 5,069,025 A | * | 12/1991 | Iversen | A01D 34/73 56/295 |
| 5,074,044 A | * | 12/1991 | Duncan | B23D 59/006 30/124 |
| 5,179,823 A | * | 1/1993 | Pace | A01D 43/16 56/17.2 |
| 5,199,251 A | * | 4/1993 | Rouse | A01D 34/73 56/295 |
| 5,210,996 A | * | 5/1993 | Fassauer | A01D 34/695 56/12.8 |
| 5,233,820 A | * | 8/1993 | Willsie | A01D 34/73 56/DIG. 17 |
| 5,363,635 A | * | 11/1994 | White, III | A01D 34/005 56/295 |
| 5,372,002 A | * | 12/1994 | Collicutt | A01D 45/30 56/128 |
| 5,588,289 A | * | 12/1996 | Wilson | A01G 3/062 30/124 |
| 5,839,263 A | * | 11/1998 | Biernath | A01D 34/73 56/DIG. 17 |
| 5,862,595 A | * | 1/1999 | Keane | A01D 43/077 30/124 |
| 5,875,700 A | * | 3/1999 | Powell | A01D 34/73 30/276 |
| 5,894,630 A | * | 4/1999 | Bitner | A47L 5/14 15/330 |
| 6,105,253 A | * | 8/2000 | Kolbert | A01G 3/0535 30/276 |
| 6,470,662 B1 | * | 10/2002 | Burke | A01D 34/73 56/295 |
| 6,487,840 B1 | * | 12/2002 | Turner | A01D 34/005 56/295 |
| 6,588,111 B2 | * | 7/2003 | Williams | B27B 9/02 30/276 |
| 6,655,119 B2 | * | 12/2003 | Hasei | A01D 34/73 56/DIG. 17 |
| 6,675,569 B2 | * | 1/2004 | Mannon | A01D 34/005 56/295 |
| 6,751,871 B2 | * | 6/2004 | Furnish | A01D 43/063 30/276 |
| 6,862,875 B2 | * | 3/2005 | Iida | A01D 34/71 56/320.2 |
| 6,886,258 B2 | * | 5/2005 | Swanson | A01G 3/0535 30/276 |
| 6,892,461 B2 | * | 5/2005 | Peterson | A01D 34/4167 30/276 |
| 7,100,287 B2 | * | 9/2006 | McCoid | A01D 34/90 30/276 |
| 7,124,566 B2 | * | 10/2006 | Treger | A01D 34/73 56/295 |
| 7,249,450 B2 | * | 7/2007 | Iida | A01D 34/71 56/320.2 |
| 7,299,612 B2 | * | 11/2007 | Schuyler | A01D 34/73 56/295 |
| D590,221 S | * | 4/2009 | Swanson | D8/8 |
| 7,617,664 B1 | * | 11/2009 | Fitzpatrick | A01D 34/005 56/DIG. 17 |
| D618,253 S | * | 6/2010 | Wilson | D15/10 |
| 7,730,708 B2 | * | 6/2010 | Siler | A01D 34/73 56/295 |
| 9,003,754 B1 | * | 4/2015 | Fogle, III | A01D 34/73 56/295 |
| 2002/0069631 A1 | * | 6/2002 | Dyke | A01D 34/005 56/12.7 |
| 2003/0182917 A1 | * | 10/2003 | Wadzinski | A01D 34/6806 56/295 |
| 2005/0172601 A1 | * | 8/2005 | Besogne | A01D 34/826 56/295 |
| 2005/0210852 A1 | * | 9/2005 | Lancaster | A01D 34/73 56/295 |
| 2006/0123635 A1 | * | 6/2006 | Hurley | A01D 34/4163 30/276 |
| 2007/0028459 A1 | * | 2/2007 | Thomson | A01D 34/4168 30/276 |
| 2008/0161968 A1 | * | 7/2008 | Adegbile | A01D 34/008 56/229 |
| 2008/0282553 A1 | * | 11/2008 | Woody | A01G 3/0535 30/276 |
| 2009/0038283 A1 | * | 2/2009 | Hurley | A01D 34/902 56/12.7 |
| 2010/0146794 A1 | * | 6/2010 | Marcoe | A01G 1/125 30/276 |
| 2011/0277438 A1 | * | 11/2011 | Perruso, Jr. | A01D 34/73 56/295 |
| 2012/0110970 A1 | * | 5/2012 | Blarek | A01D 34/73 56/295 |
| 2012/0177306 A1 | * | 7/2012 | DeHart | A01D 43/063 383/22 |
| 2014/0109412 A1 | * | 4/2014 | Grande | A01D 43/063 30/124 |
| 2014/0123498 A1 | * | 5/2014 | Grande | A01D 43/0636 30/124 |
| 2014/0150267 A1 | * | 6/2014 | Sowell | A01D 34/4166 30/276 |
| 2015/0013298 A1 | * | 1/2015 | Gaeddert | A01D 34/71 56/320.2 |
| 2015/0359171 A1 | * | 12/2015 | Butler | A01D 34/005 56/295 |
| 2015/0366133 A1 | * | 12/2015 | Nojiri | A01D 34/90 30/276 |

\* cited by examiner

Weed Trimmer Extension Device

Weed Trimmer with Collecting Bag

PRIOR ART

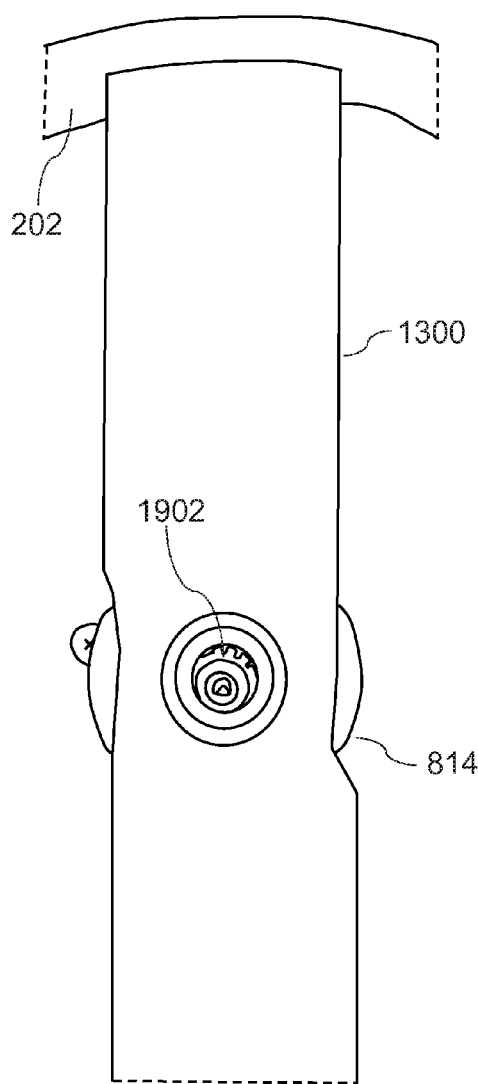
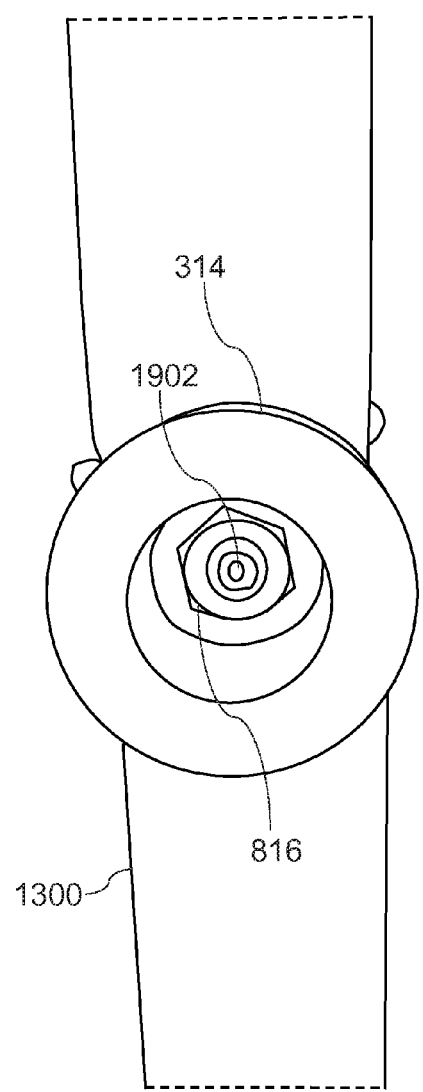

WEED TRIMMER EXTENSION DEVICE

CROSS-REFERENCE TO RELATED APPLICATIONS

This application is a continuation in part of application Ser. No. 14/160,466, filed Jan. 21, 2014, which is a continuation-in-part of application Ser. No. 14/058,278, filed Oct. 20, 2013, which claims priority to U.S. Provisional Application No. 61/795,665, filed Oct. 22, 2012. Additionally, this application claims priority to U.S. Provisional Application No. 62/020,298, filed Jul. 2, 2014.

FIELD OF THE INVENTION

The present invention relates generally to the field of weed trimming devices, and more specifically to weed trimming devices that can collect or spread weed cuttings during use.

BACKGROUND OF THE INVENTION

A weed trimmer, often also referred to as a string trimmer, weed eater, weed whip, weed cutter, or edge trimmer, works on the principle that a line is stretched out from its fast rotating head by centrifugal force, and can thereby cut grass, weed, and thin branches. A weed trimmer can also use a chain trimmer, metal trimmer blade, or other lightweight cutting implements. Weed trimmers are characterized by having a cutting implement at the end of a long shaft with a handle or handles. They are designed as relatively lightweight devices for one-hand or two-hand operation, and sometimes can be used in conjunction with a shoulder strap.

Weed trimmers have become very popular since their invention in the early 1970's. However, it has remained a problem that these devices will shed the cutting remains in the immediate area of operation.

Some attempts have been made to implement container devices for the weed cuttings. Most notably, it has been attempted to combine a weed trimmer with a weed vacuum, so that the trimmings will be collected in the weed vacuum bag. These devices suffer from a number of problems, particularly they can become very heavy, and they are ineffective because the weed trimmer operation does not work well in conjunction with the inward suction from the vacuum, causing a tendency for a proportion of the cuttings to be pushed to the side instead of into the vacuum bag. Because of these problems, such devices with container bags have not been adopted widely in the market place.

As such, it may be appreciated that there continues to be a need for novel and improved weed trimming devices that can collect weed cuttings during use.

SUMMARY OF THE INVENTION

The foregoing needs are met, to a great extent, by the present invention, wherein in aspects of this invention, enhancements are provided to the existing models of weed trimmers.

In various aspects of the invention, a conventional weed trimmer can be extended with a component that collects or disperses weed cuttings during use.

In an aspect of this invention, a weed trimmer extension device for cutting and collecting, or dispersing weeds can include a cutting enclosure, to which can be attached a collecting bag or a cutting disperser. The weed trimmer extension device can be attached to a conventional weed trimmer.

In a related aspect of this invention, a weed trimmer with collecting bag can include a conventional weed trimmer, a cutting enclosure, to which can be attached either a collecting bag or a cutting disperser, so that weeds are driven from the cutting string or device, directed by the cutting enclosure into the cutting bag.

In a related aspect, a cutting implement of the weed trimmer can include a cutting blade and at least one cutting string, so that the cutting string is configured to have a greater perimeter reach, whereby the cutting string can cut grass or weeds close to an obstruction, such as a tree or fence, without the cutting blade touching and potentially causing serious damage to the obstruction.

In a further related aspect, the cutting string can be mounted to the end of the cutting blade.

In a related aspect, the cutting enclosure can be configured with a rim that is mounted on the inside of the upper part of the cutting enclosure; and the cutting implement can be configured with at least one vertical fin, that is mounted perpendicular to the direction of rotation, on an inner side of the cutting implement, between the cutting implement and the cutting enclosure; whereby the vertical fin will create a vortex of air that gets sucked in from underneath the cutting enclosure, and is ejected out via an opening in the rim.

In an aspect, a cutting implement of a weed trimmer extension device can be comprised of a cutting blade, which further comprises cutting edges, which face in the direction of circular rotation, and perpendicular fins, which are perpendicularly connected to the cutting blade. The perpendicular fins push air in the direction of motion when the cutting implement is rotating, thereby creating a circulating planar vortex of air inside the sidewalls of the cutting enclosure.

In a related aspect, the perpendicular fins can further include apertures, such as holes or cutouts, which may reduce airflow and provide space for rotation of the cutting implement.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

BRIEF DESCRIPTION OF THE DRAWINGS

FIG. 23 is a bottom perspective view of a naked head of a conventional weed trimmer with a cutting enclosure, a separator disc, and a replacement cutting implement mounted thereon, according to an embodiment of the invention.

FIG. 24 is a bottom perspective view of a naked head of a conventional weed trimmer with a cutting enclosure, a separator disc, a replacement cutting implement, and a protruding spacer mounted thereon, according to an embodiment of the invention.

DETAILED DESCRIPTION

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

Throughout this disclosure, a conventional weed trimmer shall be defined to include such devices commonly known as string trimmers, weed eaters, weed whips, weed cutters, edge trimmers, etc. A conventional weed trimmer has a rotating cutting implement that can cut with a rotating string, metal wire, or other metal or plastic cutting device. These conventional weed trimmers do not have any mechanism or function for retaining the grass cuttings. They are typically powered by an internal combustion or electrical engine.

Figure 17:
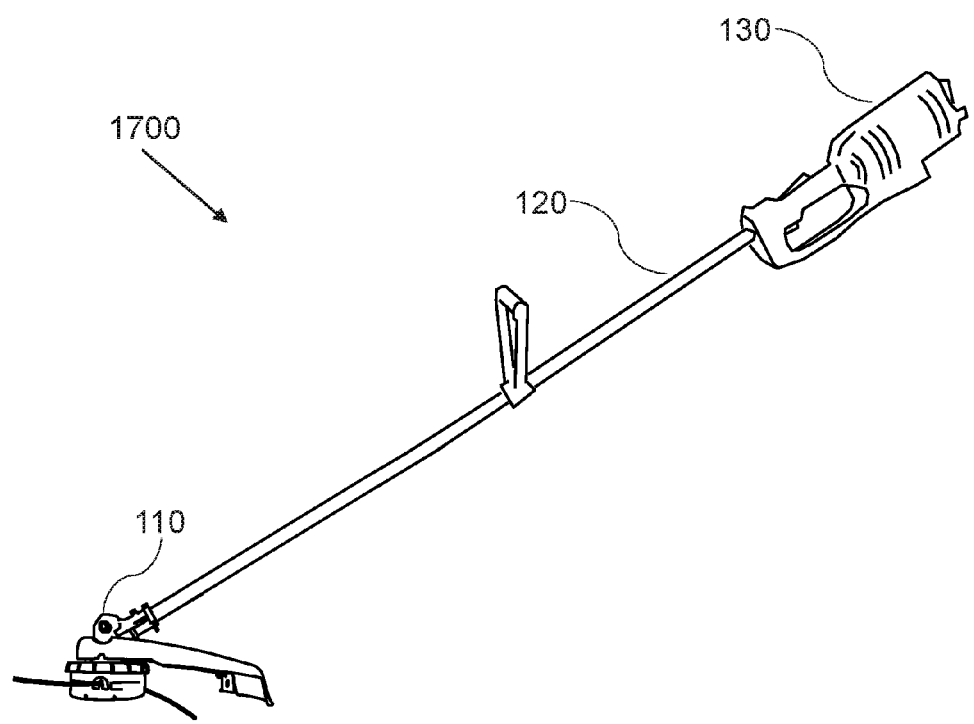
FIG. 17 is a side perspective view of a conventional weed trimmer.

As shown in FIG. 17, a conventional weed trimmer 1700 can include an engine 130, which is typically mounted on an upper end of a shaft 120, such that rotational power is transmitted via an inner axle (not visible) inside the shaft 120, down to a trimmer head 110, mounted in a lower end of the shaft.

Figure 18:
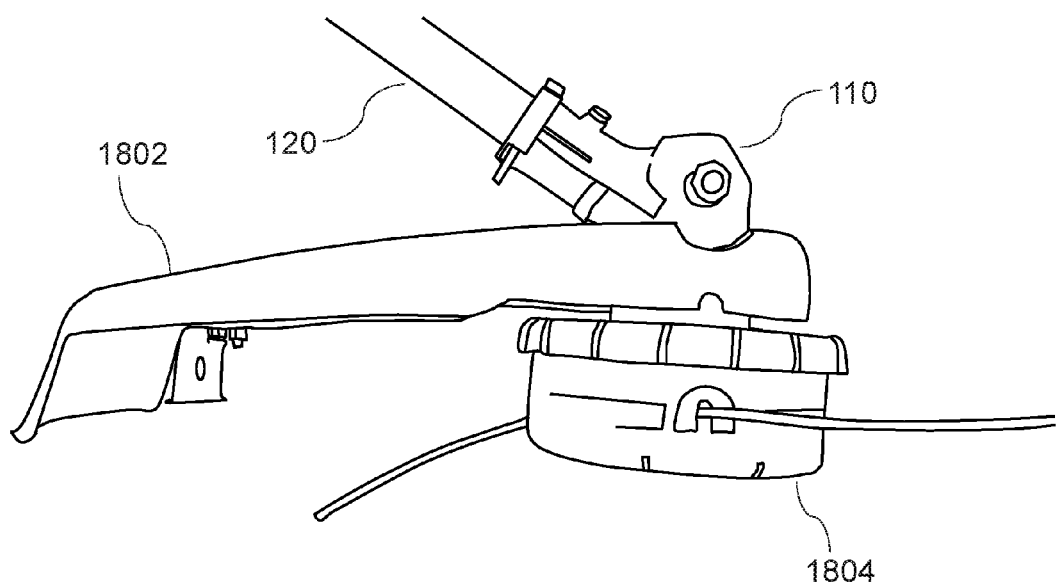
FIG. 18 is a side perspective view of a conventional weed trimmer head with a cutting guard and an original cutting implement mounted thereon.

As shown in FIG. 18, further illustrating components of the conventional weed trimmer 1700, a cutting guard 1802 can be mounted on the trimmer head 110, and an original cutting implement 1804 can be rotationally mounted to a rotatable axle (not visible in FIG. 18) that protrudes from a bottom end of the trimmer head 110.

Figure 19:
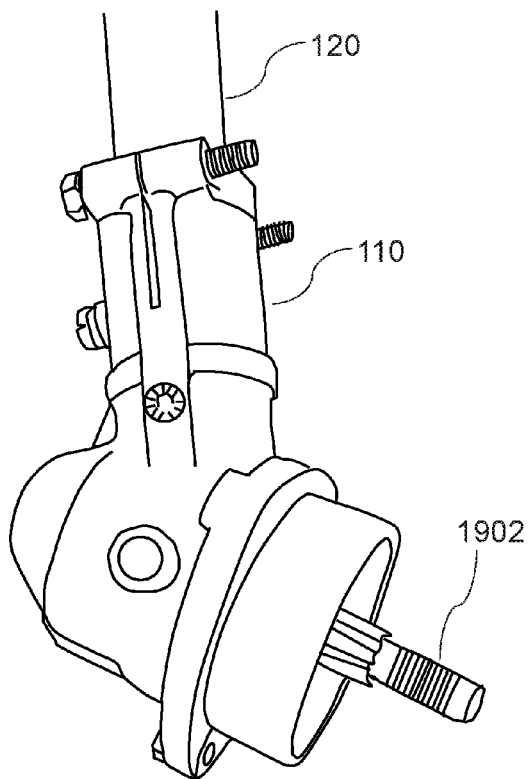
FIG. 19 is a side perspective view of a naked head of a conventional weed trimmer.

FIG. 19 shows a side perspective view of the naked trimmer head 110, i.e. the trimmer head 110 without the cutting guard 1802 and the original cutting implement 1804 mounted, further showing the rotatable axle 1902 protruding from the bottom end of the naked trimmer head 110. The outer end of the rotatable axle 1902 can be threaded, such that an axle nut can be fastened onto the rotatable axle 1902.

Figure 20:
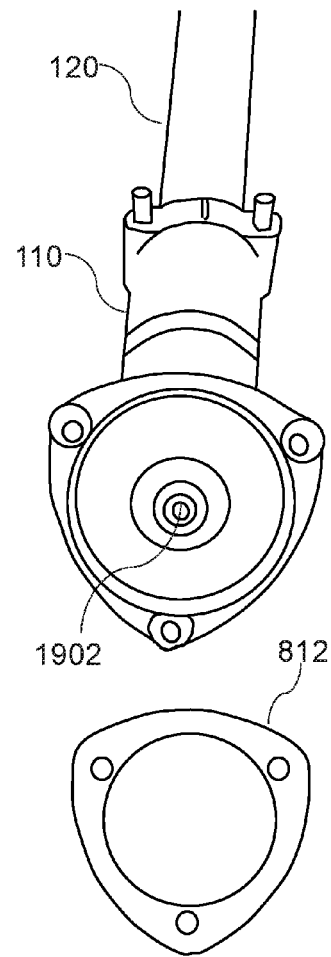
FIG. 20 is a bottom perspective view of a naked head of a conventional weed trimmer.

FIG. 20 shows a bottom perspective view of the naked trimmer head 110, further showing a cutting enclosure washer 812 prior to installation on the trimmer head 110.

In the following, we describe the structure of a weed trimmer extension device 100 with reference to FIG. 1, in such manner that like reference numerals refer to like components throughout; a convention that we shall employ for the remainder of this specification.

Figure 1:
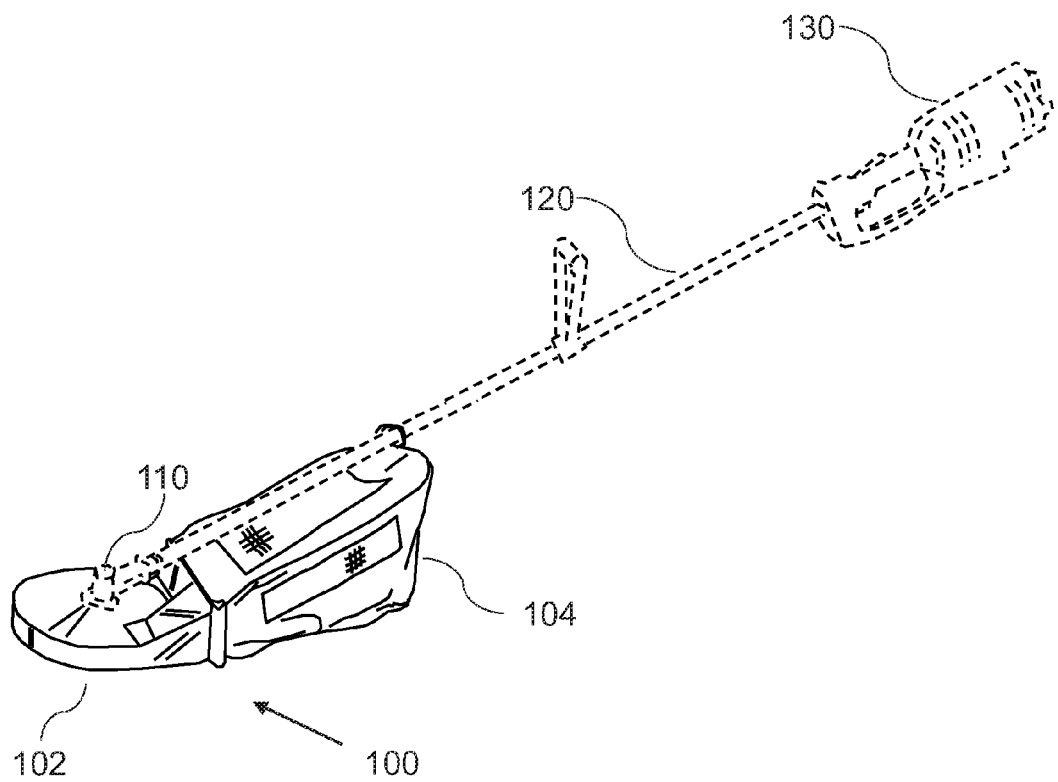
FIG. 1 is a perspective view of a weed trimmer extension device, according to an embodiment of the invention.
Figure 3:
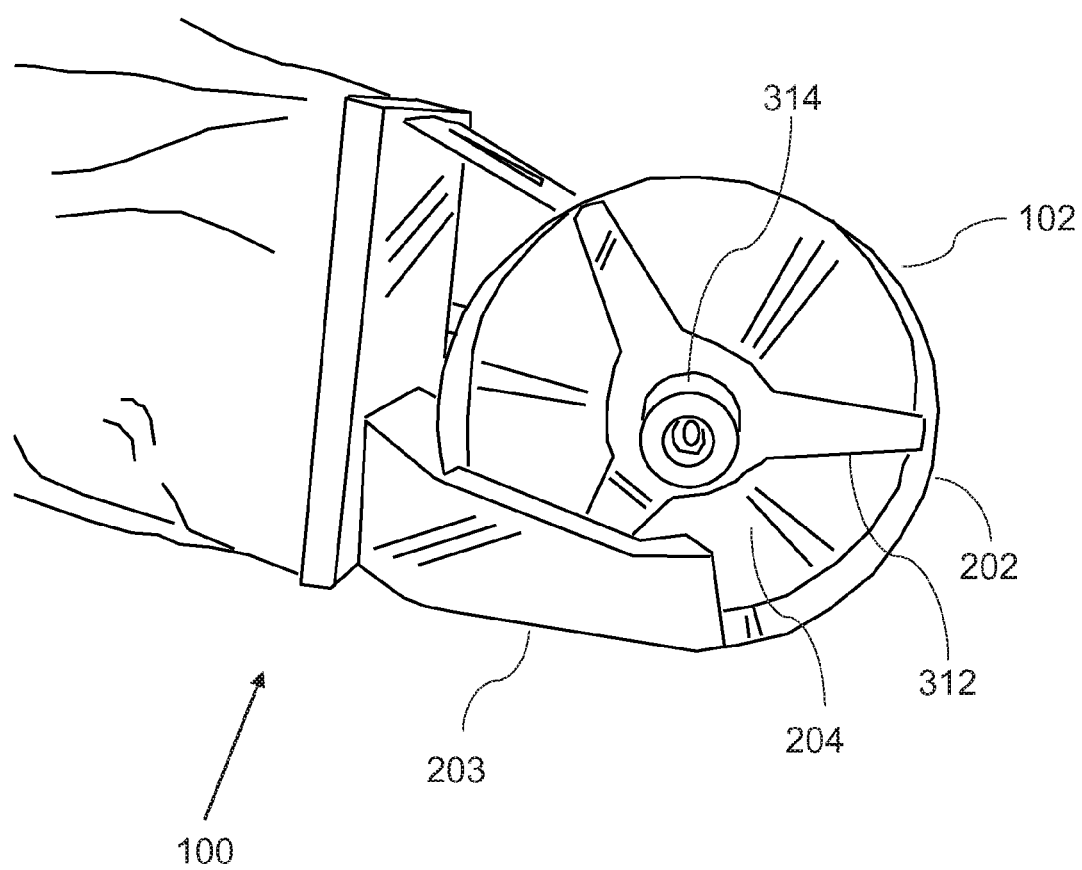
FIG. 3 is a bottom view of a cutting enclosure, according to an embodiment of the invention.
Figure 8:
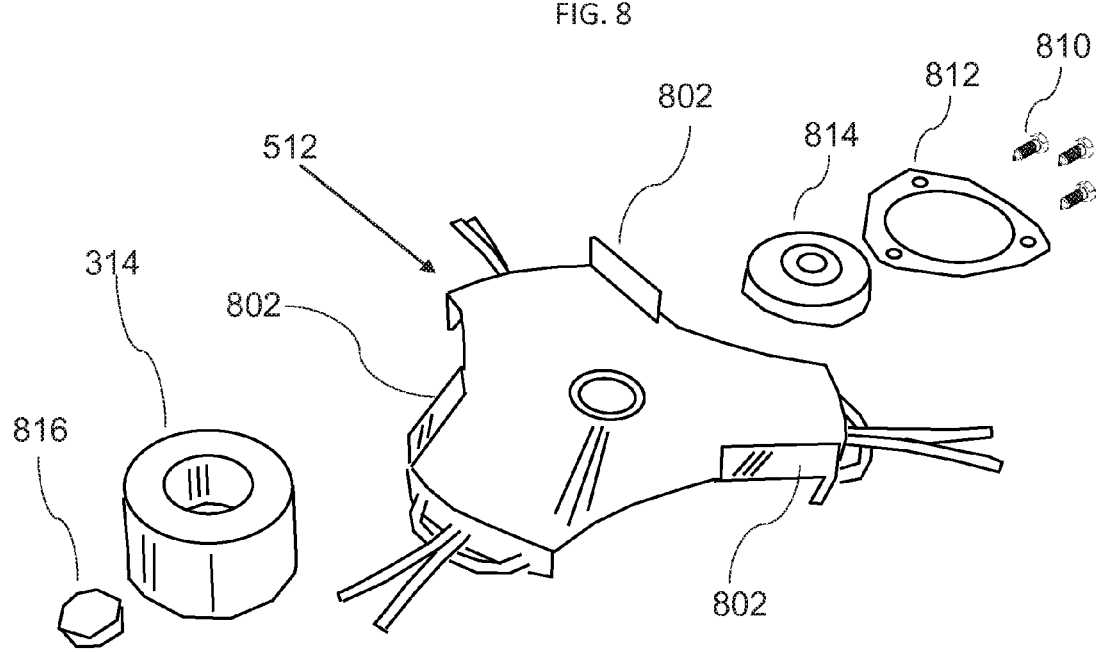
FIG. 8 is a perspective view of a cutting implement with mounting parts and protruding spacer, according to an embodiment of the invention.

In an embodiment, as shown in FIG. 1, a weed trimmer extension device 100 for cutting and collecting weeds can include:
 a. a cutting enclosure 102;
 b. enclosure fasteners 810, shown in FIG. 8, which can be fastening bolts 810;
 c. a replacement cutting implement 312, as shown in FIG. 3;
 d. a cutting implement fastener 816, shown in FIG. 8, which can be a cutting implement nut 816;
 e. a collecting bag 104;
 wherein the cutting enclosure is attached to a naked trimmer head 110 of a conventional weed trimmer 1700 with the enclosure fasteners 810, and the replacement cutting implement 312 is attached to a rotatable axle 1902 of the naked trimmer head 110, such that the cutting enclosure 102 is configured to cover the rotatable replacement cutting implement 312, above and to the sides of the rotatable replacement cutting implement 312, such that a bottom aperture of the cutting enclosure exposes the underside of the cutting implement 312, such that the cutting enclosure 102 in combination with a rotation of the replacement cutting implement 312 is configured to create a substantially planar air vortex that propels cuttings, which are contained and directed by the cutting enclosure 102, and wherein the cuttings are ejected through an ejection aperture in a side of a rear end of the cutting enclosure 102.

In a related embodiment, the ejection aperture can be substantially at level with the plane of rotation of the replacement cutting implement 312.

In related embodiments, common fastening components are bolts and other types of fasteners that are well known as fastening components to attach a cutting implement to an axle on common weed trimmers. FIG. 8 shows an example of common fastening components, including enclosure fasteners, comprising fastening bolts 810, and a cutting enclosure washer 812, for attaching the cutting enclosure 102 to the standard cutting head of the conventional weed trimmer. Also shown are a separator disc 814, for separating the cutting implement from the top of the cutting enclosure 102, and a cutting implement nut 816, for tightening the cutting implement 312, 512 to the rotatable axle 1902 of the trimmer head 110 of the conventional weed trimmer 1700.

Figure 2:
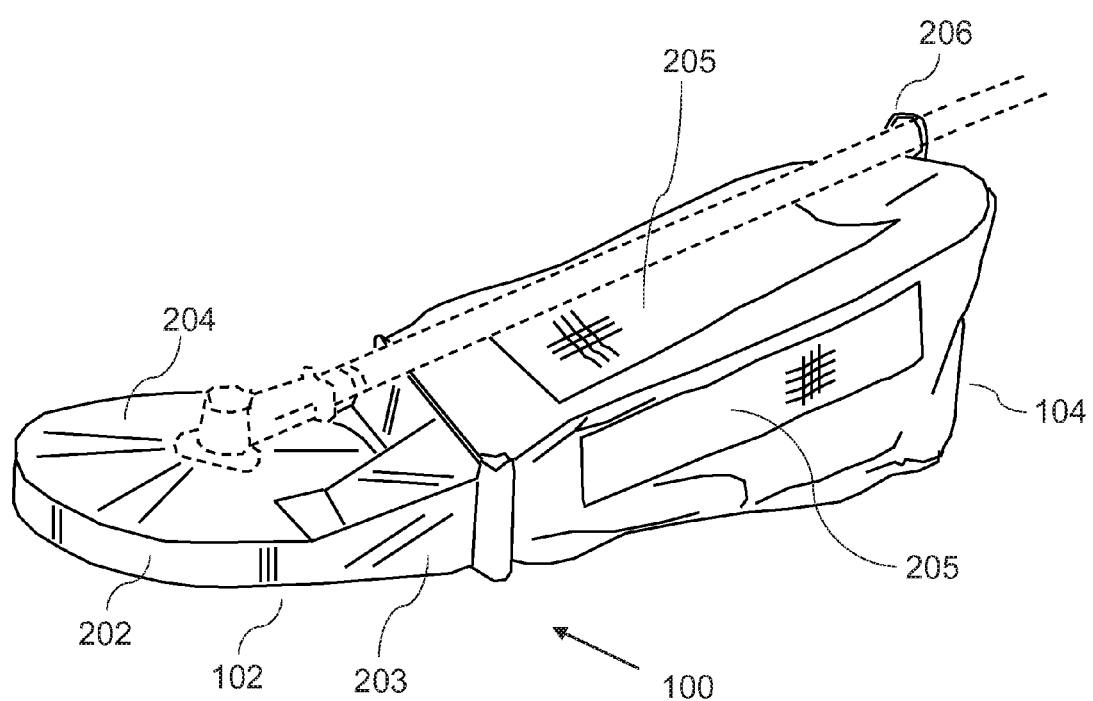
FIG. 2 is a perspective view of a weed trimmer extension device, according to an embodiment of the invention.

In a related embodiment, as shown in FIG. 2, the cutting enclosure 102 can further include an ejection canal 203 for ejecting the cuttings from the cutting enclosure 102.

In a related embodiment, as shown in FIGS. 2 and 3, the cutting enclosure 102, can include:
a. a sidewall 202, which covers the cutting implement 312 to the sides of the cutting implement 312;
b. a top 204, such that the top is connected with the sidewall 202, which covers the cutting implement 312 above the cutting implement 312;
whereby the cutting enclosure 102 is configured to cover the cutting implement 312, above and to the sides of the cutting implement 312.

In a related embodiment, the cutting enclosure, as shown in FIGS. 2 and 3, can have a substantially flat top.

In a related embodiment, the substantially flat top can as shown have a slight upward angle from an upper edge of the sidewall to a central aperture of the top 204, where the central aperture fits with a trimmer head for connection to the trimmer head.

In a related embodiment, the slight upward angle can be substantially uniform in a range of 0 to 30 degrees.

In a related embodiment, a height difference between the upper edge of the sidewall 202 to the central aperture of the top 204 can be in a range of 0 to 5 centimeter.

In a related embodiment, the collection bag 104 can include one or more mesh screens 205, which can be made of a mesh fabric that will allow airflow, so that air pressure can be reduced when air enters the collection bag 104 from the ejection canal 203 during operation. The mesh screen 205 thereby can function to avoid or reduce pressure accumulation in the collection bag 104, which could decrease cutting effectiveness, and the mesh screen 205 can also allow a user to visually inspect the contents of cuttings in the collection bag 104. As shown in FIG. 2, the collection bag 104 can for example include mesh screens 205 on both the top and sides.

In a related embodiment, FIG. 3 shows an underside view of the cutting enclosure 102. The cutting implement 312 can either be a standard cutting implement, which is a part of the conventional weed trimmer 1700, or can be a replacement cutting implement that is a part of the weed trimmer extension device 100. The cutting implement 312 can rotate clockwise, when viewed from below, such that the cutting enclosure 102 in combination with a rotation of the cutting implement 312 is configured to create a substantially planar air vortex, which drives cuttings through the ejection canal through an ejection aperture 402, as shown on FIG. 4, whereby the cutting are ejected out of the cutting enclosure into the connecting collecting bag 104.

In a related embodiment, shown in FIG. 3, the cutting implement 312 can be mounted with a protruding spacer 314, which protrudes underneath the cutting implement 312, whereby the protruding spacer 314 reduces a risk of close contact with the ground, thereby reducing the strength of the air vortex, to limit the risk of stones being picked up, and also reduce the risk of the cutting implement 312 impacting the ground during use.

Related to this, it may be noted that since the ground can have a varying shape and may have protrusions, such as stones, on its surface, the protruding spacer 314, may not eliminate the risk of close contact with at least parts of the ground, since for example a stone to the side of the protruding spacer 314, could still protrude up to hit the cutting implement 312. However, in general, particularly on relatively smooth ground surfaces, the protruding spacer 314 can serve to reduce the risk of close contact with the ground.

In a related embodiment, the protruding spacer 314 can have a smooth lower end surface, such that when the protruding spacer 314 is rotating with the cutting implement 312 during use, the protruding spacer 314 causes minimal friction or vibration if the protruding spacer 314 impacts with ground.

Figure 11:
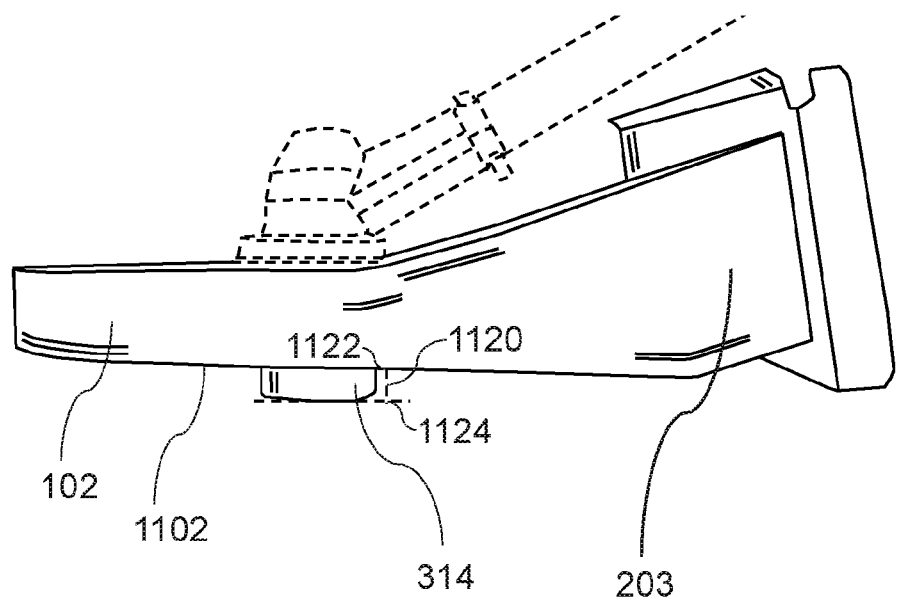
FIG. 11 is a side view of a cutting enclosure, showing a protruding spacer, according to an embodiment of the invention.

FIG. 11 illustrates a side view of the cutting enclosure 102 and the ejection canal 203, showing the protruding spacer 314 protruding underneath the enclosure, thereby preventing the bottom 1102 of the cutting enclosure coming in contact with ground, and ensuring an opening between ground and the cutting enclosure. An external protrusion 1120 of the protruding spacer 314 is defined as the vertical distance from the lowest edge 1122 of the bottom 1102 of the enclosure 102, to the lowest part 1124 of the protruding spacer 314. In typical configurations, the external protrusion of the protruding spacer 314 can be in a range of 0.5-2 inches. FIG. 11 illustrates a protruding spacer 314 with a lower surface comprised of circular flat edge with a center aperture, similar to the protruding spacer 314 shown in FIGS. 3, 5, and 8.

Figure 12:
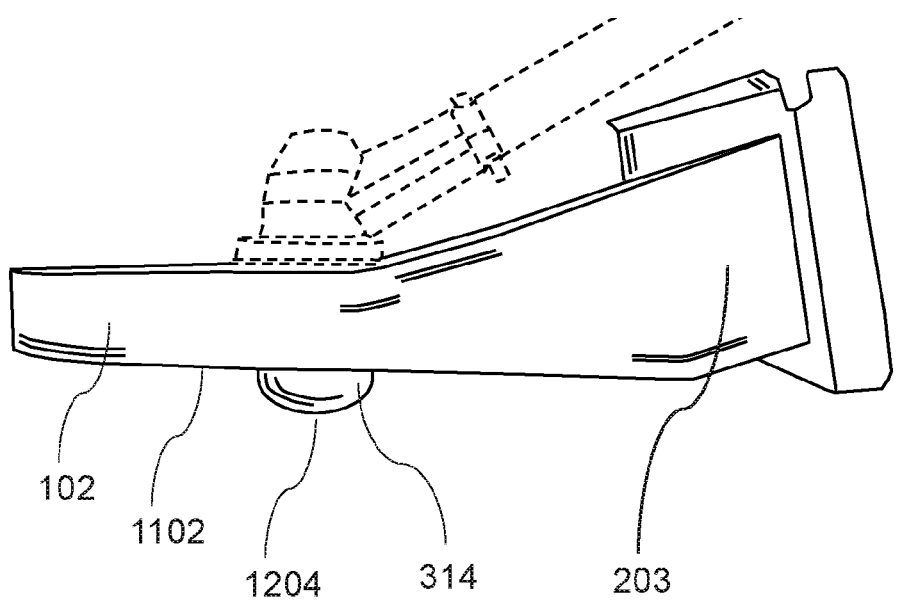
FIG. 12 is a side view of a cutting enclosure, showing a protruding spacer, according to an embodiment of the invention.

FIG. 12 illustrates a side of a protruding spacer 314, wherein the protruding spacer 314 is configured as a domed cap nut, such that the lower part is dome shaped, whereby a surface area of the protruding spacer 314 potentially touching ground is minimized, thereby causing less friction. The domed cap nut can have a threaded cavity on the inner side, such that it can be attached to the threaded axle 1902 of the trimmer head of a conventional weed trimmer. The lowest part 1204 of the protruding spacer 314 is at the center point of the downward pointing dome shape.

Figure 13:
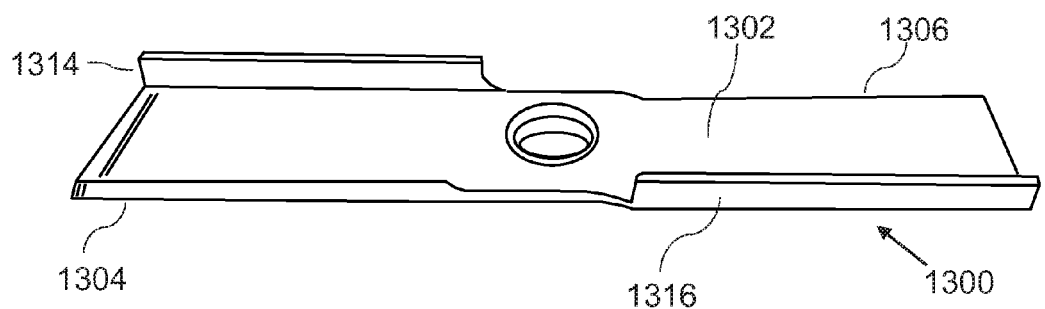
FIG. 13 is a long-side perspective view of a cutting implement with perpendicular fins, according to an embodiment of the invention.

As shown in both FIGS. 12 and 13, the protruding spacer 314 can have a smooth lower/outer end surface.

Figure 4:
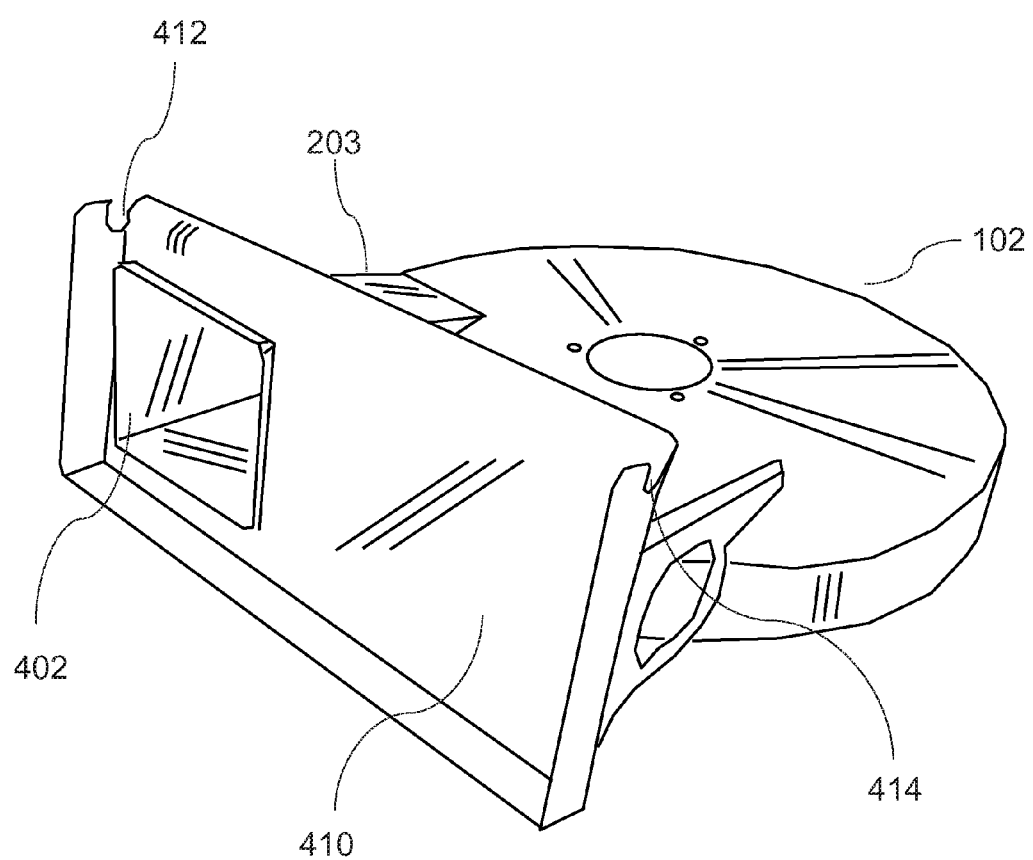
FIG. 4 is a rear view of a cutting enclosure, according to an embodiment of the invention.

In a related embodiment, FIG. 4 shows a rear view of the cutting enclosure, further including an end plate 410, which connects to the collecting bag 104, and further including the ejection aperture 402, at the end of the ejection canal 203.

In a related embodiment, the end plate 410 can further include notches 412, 414 in both top corners, or other fastening mechanisms, for attaching the collecting bag 104 to the end plate 410 of the cutting enclosure 102.

In a related embodiment, as illustrated in FIG. 2, the collection bag 104 can include a bag fastener 206 for securing the collection bag to the shaft of the conventional weed trimmer 1700. The bag fastener 206 can include:
  a. a fastening hook, for example made of metal;
  b. a fastening strap, for example made of a strong fabric, and further utilizing a hook and loop material to secure the fastening strap in place; or
  c. other fastening mechanisms, such as a clip.

Figure 5:
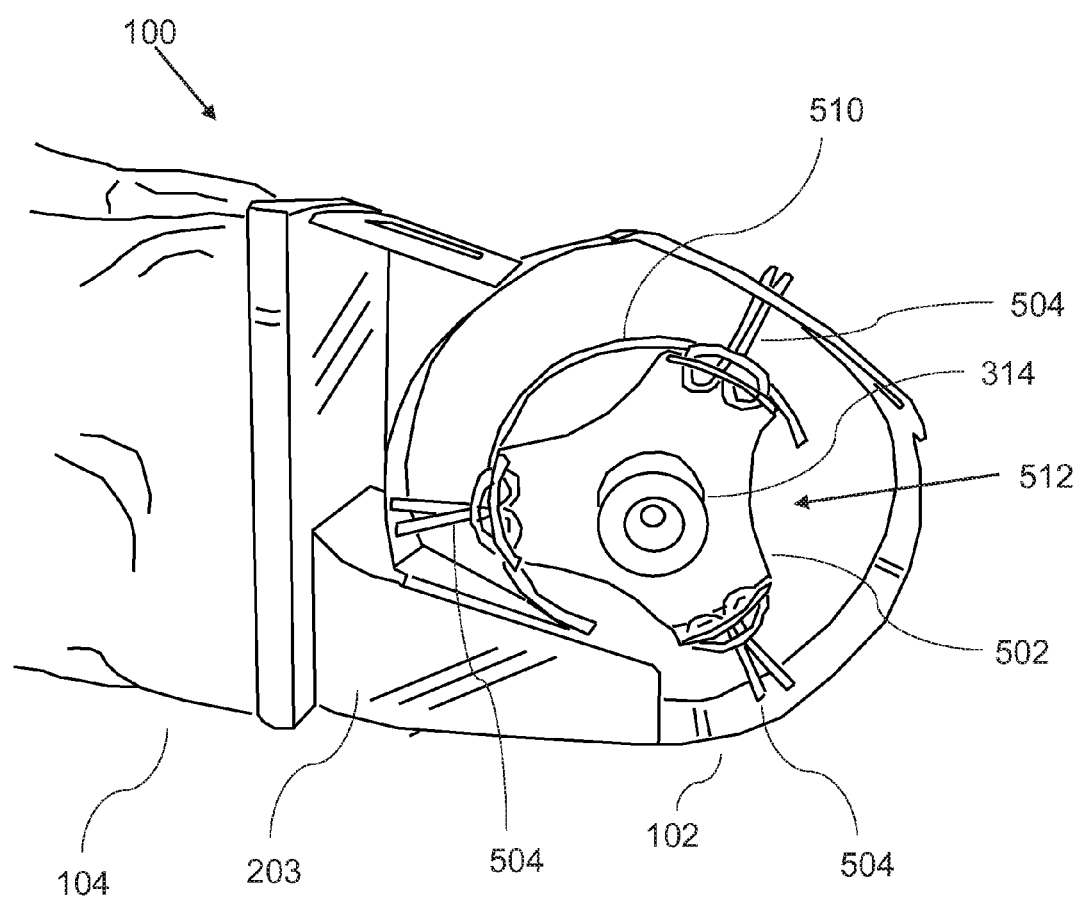
FIG. 5 is a bottom view of a cutting enclosure, according to an embodiment of the invention.

In a related embodiment, illustrated in FIG. 5, the cutting implement 512 can be further comprised of a cutting blade 502, and one or more cutting strings 504, wherein the cutting string 504 is configured to have a greater cutting radius than the cutting blade 502, extending with a greater radius in its circular sweep from the rotating axle in the center of the cutting enclosure, whereby the cutting string can cut grass close to an obstruction, such as a tree or fence, without the cutting blade touching and potentially causing serious damage to the obstruction.

In a further related embodiment, the cutting string 504 can be mounted to the end of the cutting blade 502, for example by being looped through holes in a flank at the end of the cutting blade, such as illustrated in FIG. 5.

Figure 6:
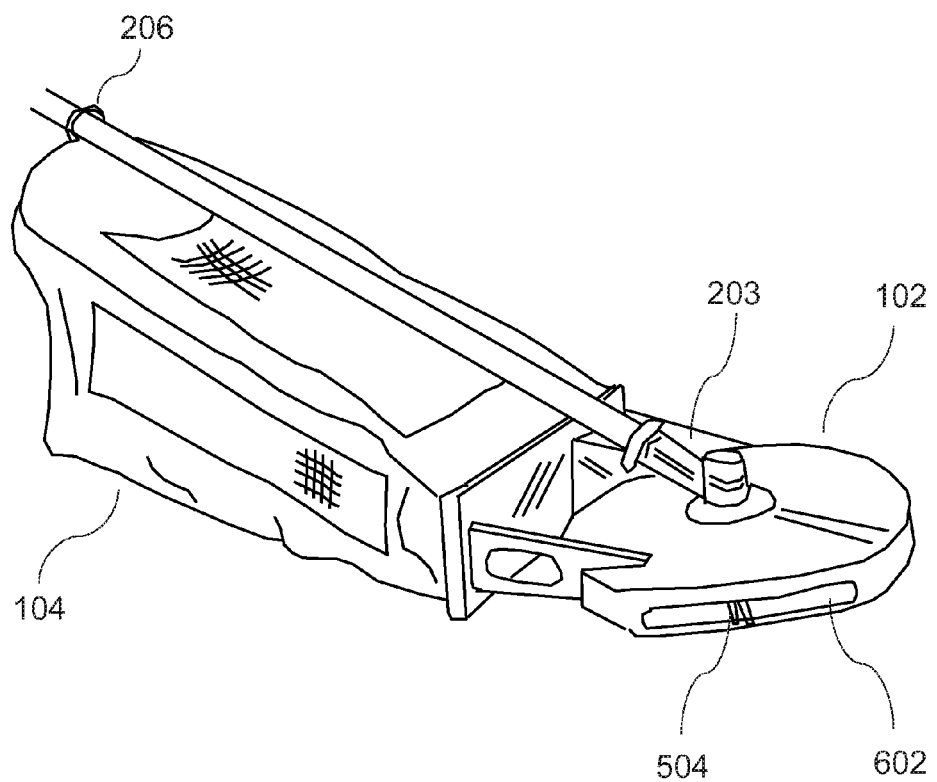
FIG. 6 is a perspective view of a weed trimmer extension device, according to an embodiment of the invention.

In a further related embodiment, as shown in FIGS. 5 and 6, the tip of the cutting strings 504 can be configured to extend beyond a segment of the sidewall of the cutting enclosure 102, and during rotation protrude through a sidewall aperture 602, in the segment of the sidewall, which has been straightened to fit inside the full radius of the generally circular sidewall.

Figure 7:
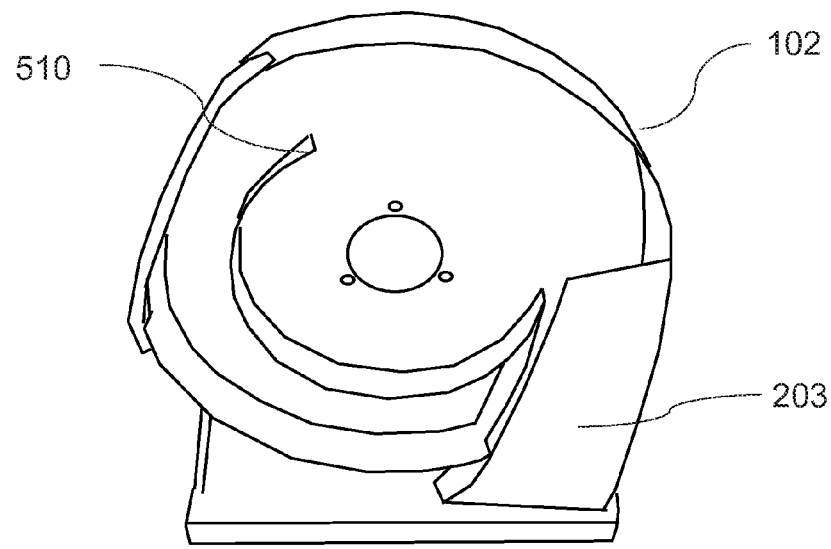
FIG. 7 is a bottom view of a cutting enclosure, according to an embodiment of the invention.

In a further related embodiment, as shown in FIGS. 5 and 7, the cutting blade 502, can rotate inside the perimeter of a circular two thirds rim 510 that is mounted on the inside of the upper part of the cutting enclosure 102, starting from the beginning inside sidewall of the ejection canal. The cutting blade 502 can further have mounted one or more vertical fins 802, as shown in FIG. 8, that are mounted perpendicular to the direction of rotation, on the inner side of the cutting blade 502, so that the vertical fins 802 will strengthen the vortex of air that gets sucked in from underneath the cutting enclosure 102, and is ejected out via the ejection canal 203.

Figure 9:
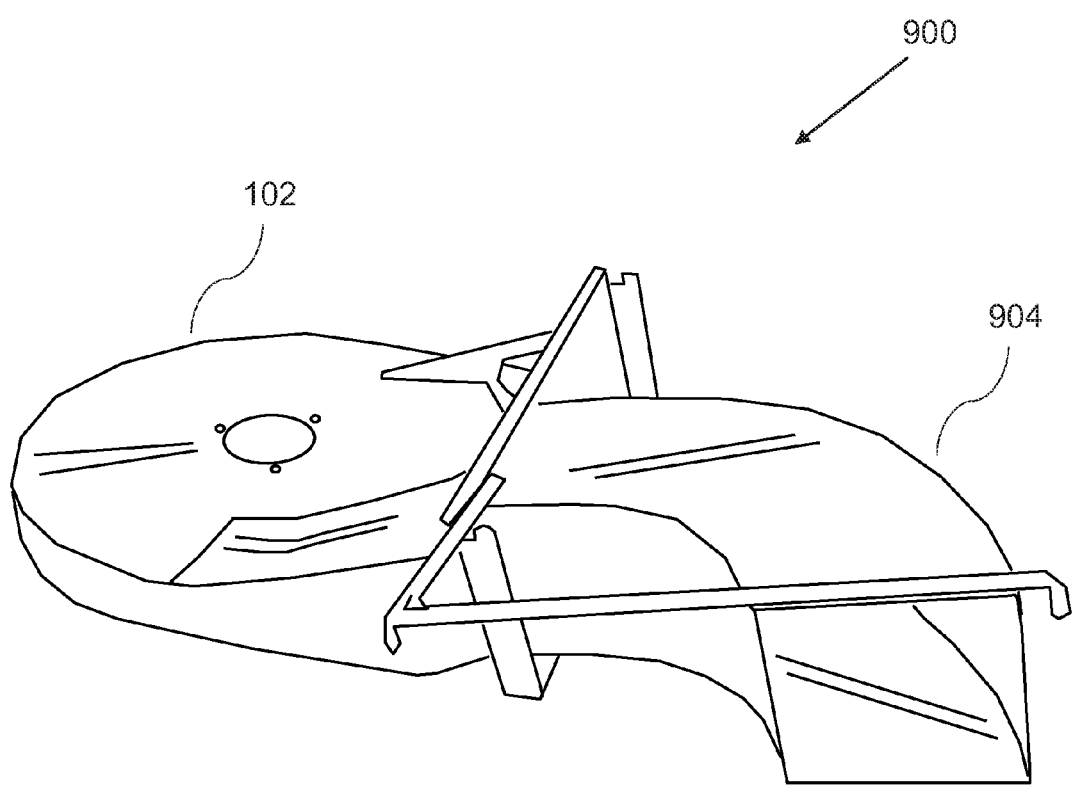
FIG. 9 is a rear-side perspective view of a cutting enclosure with cutting disperse, according to an embodiment of the invention.

In an alternative embodiment, illustrated in FIG. 9, a weed trimmer extension device 900 for cutting and dispersing weeds can include:
  a. a cutting enclosure 102; and
  b. a cutting disperser 904;
  wherein the weed trimmer extension device can be attached to a conventional weed trimmer 1700 with common fastening components, and the cutting enclosure 102 can cover a cutting implement of the conventional weed trimmer and the cutting implement propels cuttings, which are contained and directed by the cutting enclosure 102, into the cutting disperser 904, which directs and disperses the cuttings. The cutting disperser 904 is shown mounted to disperse cuttings to an area on the left side of the weed trimmer extension device, but can also be mounted to disperse cuttings to the right side.

Figure 10:
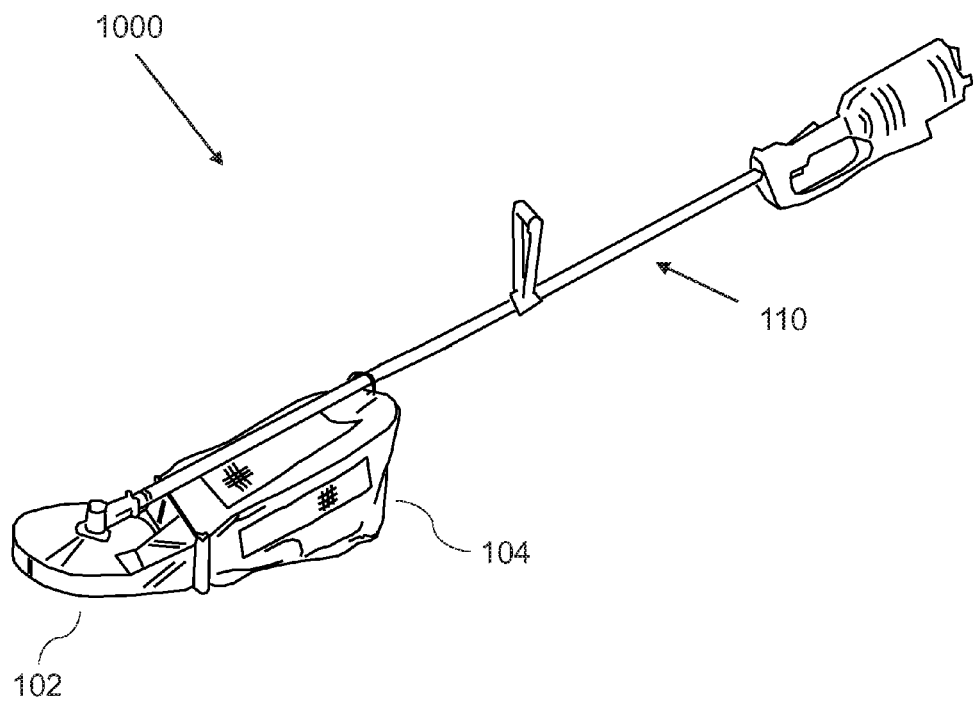
FIG. 10 is a perspective view of a weed trimmer with collecting bag, according to an embodiment of the invention.

In an embodiment, shown in FIG. 10, a weed trimmer with collecting bag 1000 for cutting and collecting weeds can include:
  a. A conventional weed trimmer 110, further comprising:
    i. A cutting implement 312, as shown in FIG. 3;
  b. a cutting enclosure 102; to which can be mounted either:
  c. a collecting bag 104;
    wherein the cutting enclosure 102 fits over and covers the cutting implement 312, and the cutting implement 312 propels cuttings, which are contained and directed by the cutting enclosure 102, into the collecting bag 104, or
  d. a cutting disperser 904, as shown in FIG. 9.

In related embodiments, the cutting enclosure 102 can be made of a plastic material, or metal, including suitable alloys, each respectively of a suitable thickness and strength, well known in the manufacturing of common shields for trimmer heads of conventional weed trimmers. For example, a gauge 13 sheet metal, such as a 3/32 inch steel plate can be used.

In a related embodiment, the collecting bag 104 can be made of a fabric or a plastic material, each respectively of a suitable flexibility, thickness, and strength. A suitable fabric material can for example be a canvas material made of cotton or linen.

In a related embodiment, as illustrated in FIG. 13, a cutting implement 1300 can be comprised of:
  a. a cutting blade 1302, which is a flat elongated piece, further comprising cutting edges 1304, 1306 on the elongated half-side of the cutting blade, which face in the direction of circular rotation; and
  b. perpendicular fins 1314, 1316 which are perpendicularly connected to the cutting blade, along a length of the cutting blade, such that surfaces of the perpendicular fins 1314, 1316 are perpendicular to the direction of motion, or velocity vector, during rotation of the cutting implement 1300.

Figure 14:
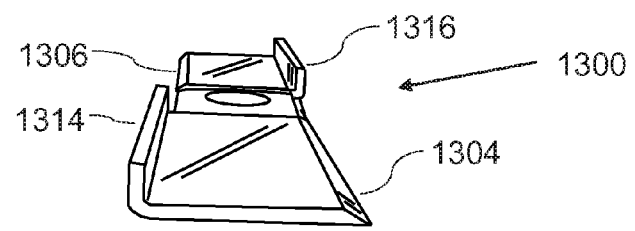
FIG. 14 is a short-side perspective view of a cutting implement with perpendicular fins, according to an embodiment of the invention.
Figure 15:
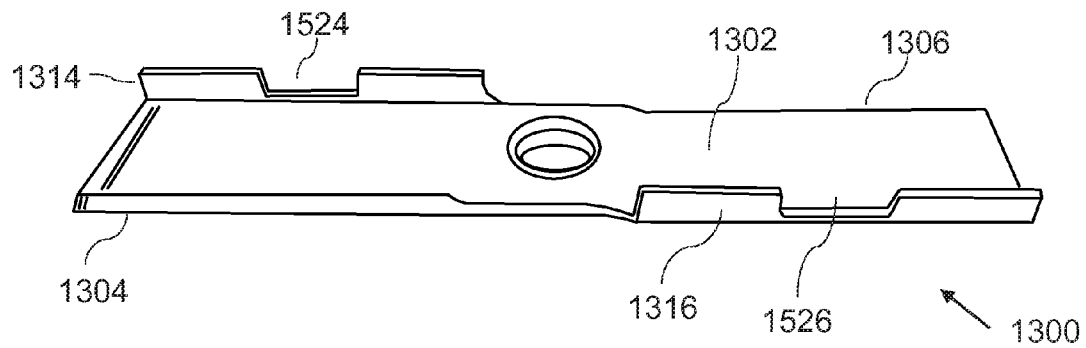
FIG. 15 is a long-side perspective view of a cutting implement with perpendicular fins, according to an embodiment of the invention.

FIG. 14 shows a side view of the cutting implement 1300 shown in FIG. 13,

In a related embodiment, as shown in FIG. 15 the perpendicular fins 1314, 1316 can further comprise apertures 1524, 1526 such as cutouts or holes, which can reduce airflow, and serve to accommodate structures of the upper inside of a cutting enclosure, when mounted in the cutting enclosure.

Figure 16:
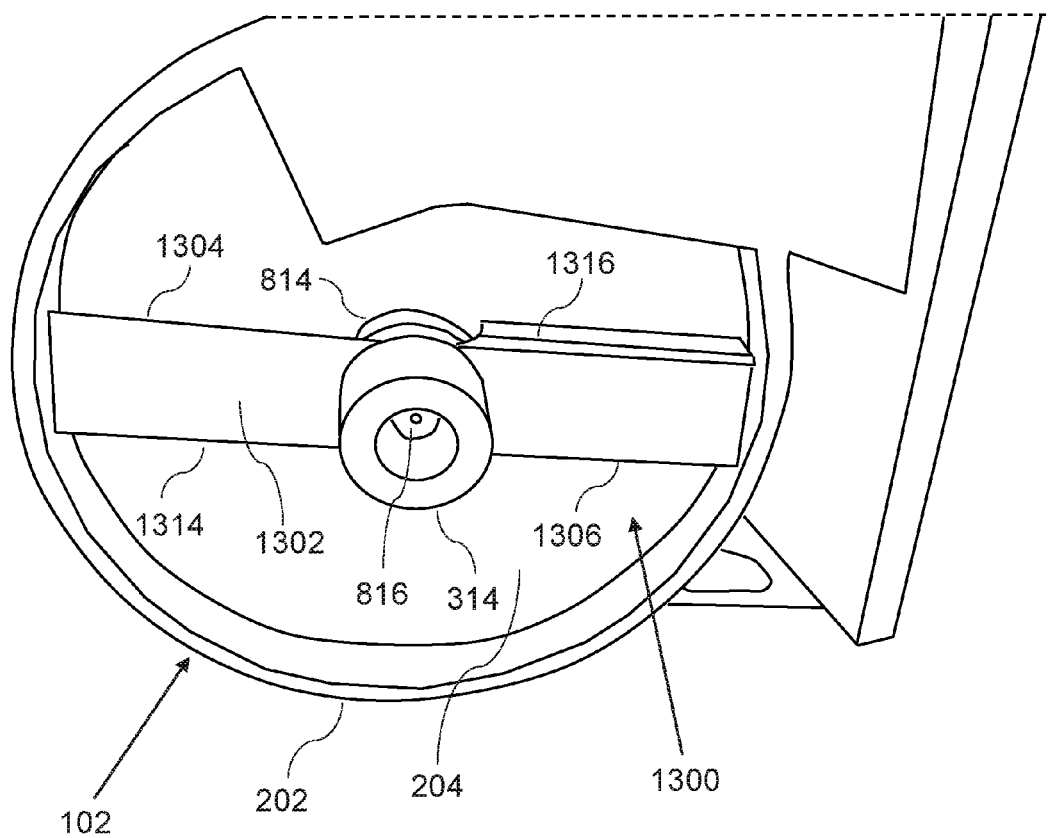
FIG. 16 is a bottom view of a cutting enclosure mounted with a cutting implement with perpendicular fins, according to an embodiment of the invention.

FIG. 16 illustrates a cutting implement 1300 mounted in a cutting enclosure 102, wherein the cutting implements, as viewed from below, rotates clockwise.

In related embodiments, the perpendicular fins 1314, 1316 are configured to push air in a circular direction of motion, thereby creating a vortex of air, which rotates in the plane spanned out by the rotating cutting blade 1302, enclosed by sidewalls 202 and top 204 of the cutting enclosure. The cutting blade 1302 is configured with a flat shape, whereby it creates only minimal air disturbance, and does not produce any inward or outward suction force. The cutting blade 1302 is not configured to function as a propeller that creates an airflow inwards trough the plane of rotation, but rather the attached perpendicular fins 1314, 1316 create a planar circulating airflow, that may radiate outward from the center of rotation due to centrifugal forces, in the plane of rotation of the cutting implement 1300, such that the cutting enclosure 102 in combination with a rotation of the cutting blade 1302, creates a planar circulating air vortex, which is then ejected via an ejection canal 203 through an ejection aperture 402.

In a related embodiment, as shown in FIG. 16, the cutting implement 1300 can be mounted such that the perpendicular fins 1314, 1316 protrude inwards, such that they are positioned between the cutting blade 1302 and the top 204 of the enclosure 102.

Figure 21:
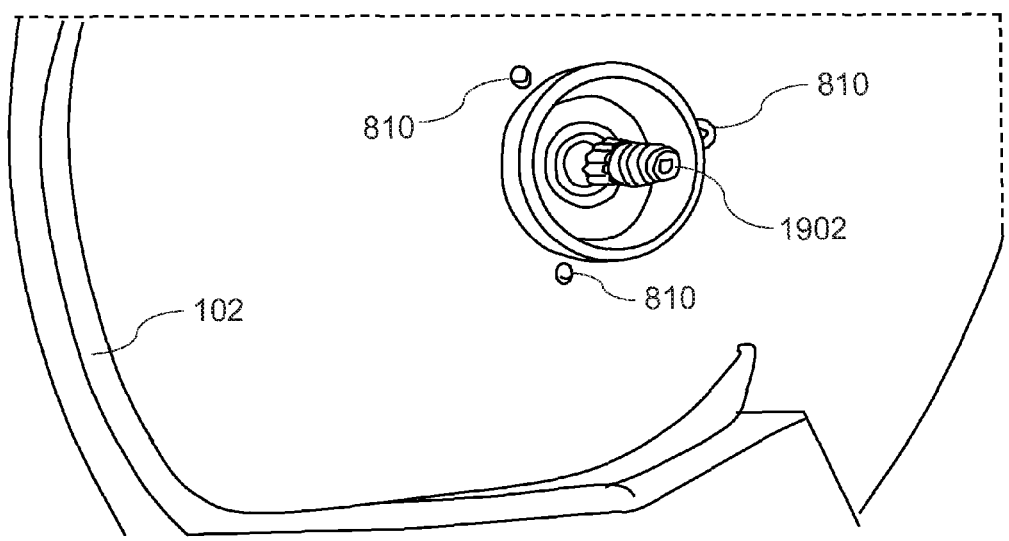
FIG. 21 is a bottom perspective view of a naked head of a conventional weed trimmer with a cutting enclosure thereon, according to an embodiment of the invention.
Figure 22:
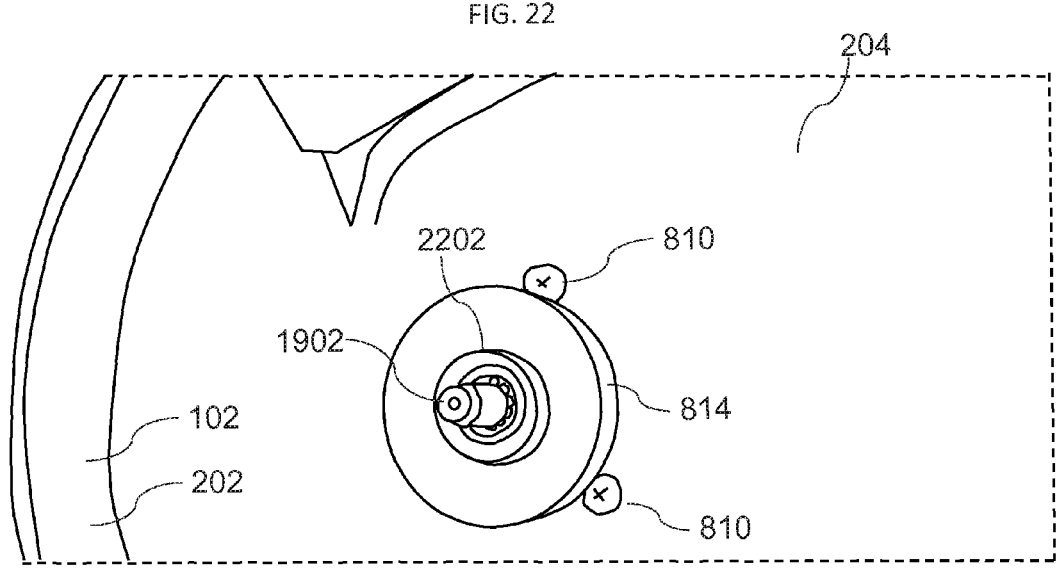
FIG. 22 is a bottom perspective view of a naked head of a conventional weed trimmer with a cutting enclosure and a separator disc mounted thereon, according to an embodiment of the invention.

FIGS. 21-24 show installation of an embodiment of the weed trimmer extension device 100 on the naked trimmer head 110 of a conventional weed trimmer 1700, such that:

a. FIG. 21 shows a bottom perspective view of a cutting enclosure 102 (only partially visible) mounted on a trimmer head 110 (not visible) with cutting enclosure fasteners 810, here shown as fastening bolts 810. The cutting enclosure washer 812 (not visible) can be mounted between the trimmer head 110 and an upper side of the cutting enclosure 102
b. FIG. 22 shows a bottom perspective view of the embodiment shown in FIG. 21, further showing a separator disc 814 mounted on the rotatable axle 1902, for separating the cutting implement 312 (not shown) from the inner top surface of the cutting enclosure 102. As shown, the separator disc 814 can further include a circular protrusion 2202 to allow a circular center aperture of a replacement cutting blade 1300 (not shown) to fit around the circular protrusion 2202;
c. FIG. 23 shows a bottom perspective view of the embodiment shown in FIG. 22, further showing a replacement cutting blade 1300 mounted on the separator disc 814. As shown, the replacement cutting blade 1300 is mounted with the circular center aperture of the replacement cutting blade 1300 mounted around the circular protrusion 2202;
d. FIG. 24 shows a bottom perspective view of the embodiment shown in FIG. 23, further showing a protruding spacer 314 mounted on the axle 1902 below the replacement cutting blade 1300, such that the protruding spacer 314 is tightened in place with a cutting implement fastener 816, which for example as shown here can be a cutting implement nut 816, screwed on to a protruding end of the axle 1902, whereby the separator disc 814, the replacement cutting implement 1300, and the protruding spacer 314 are tightened in place with the cutting implement fastener 816.

Figure 25:
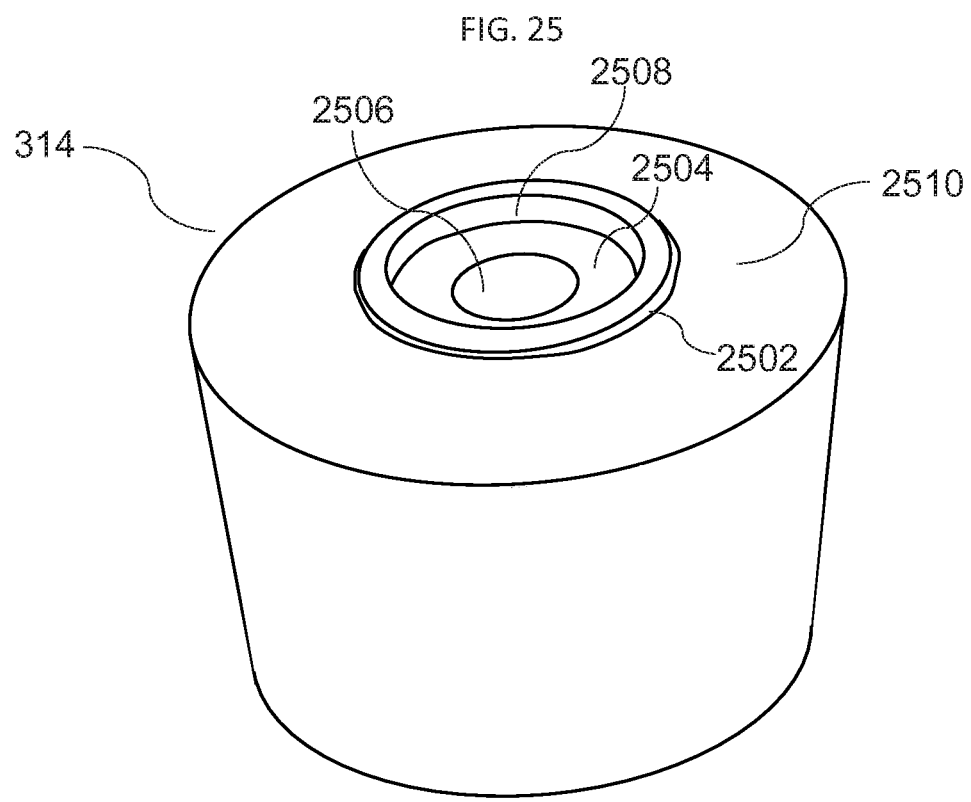
FIG. 25 is an upper perspective view of a protruding spacer, according to an embodiment of the invention.

In a related embodiment, FIG. 25 shows an upper or inner side perspective view of the protruding spacer 314. As shown, an inner side of the protruding spacer 314 can have a protruding ring 2502, to fit inside a circular center aperture of the replacement cutting blade 1300, in order to enable a tight and accurate fit. Further, as shown the protruding spacer 314 can have a spacer aperture 2508, from a central inner end 2510 to a central part of an outer end 2610 (shown in FIG. 26) of the protruding spacer 314, in which is fitted an inner ledge 2504, with a central aperture 2506, such that the axle 1902 fits through the spacer aperture 2508 and the central aperture 2506, and the cutting implement fastener or nut 816 can be fastened against an outer side of the inner ledge 2504, when the cutting implement fastener 816 is fastened to the axle 1902.

In a related embodiment, the protruding spacer 314 can be made of one piece of metal, such that the spacer aperture and the inner ledge 2504 can be machined from the one piece of metal.

Figure 26:
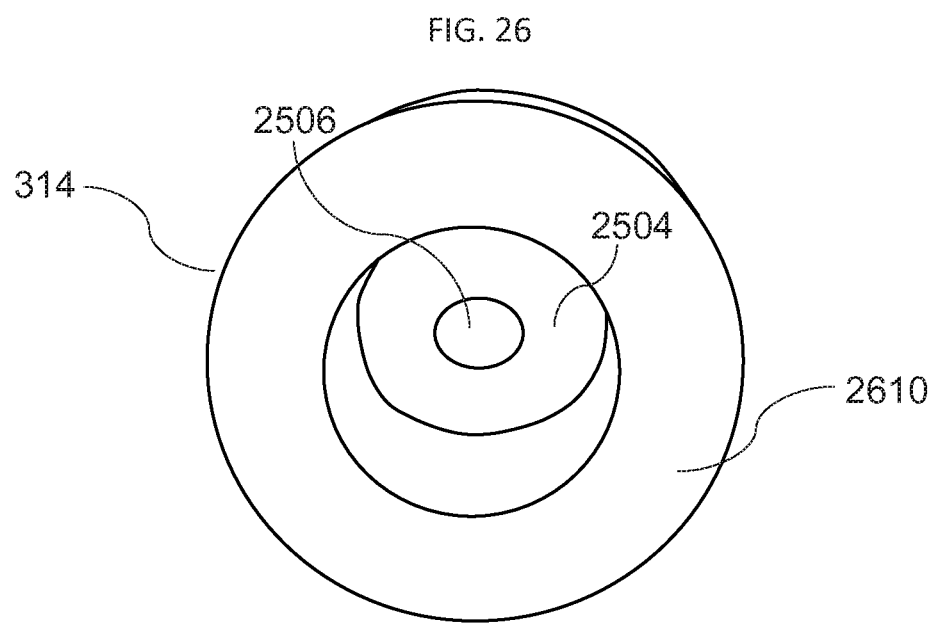
FIG. 26 is a lower perspective view of a protruding spacer, according to an embodiment of the invention.

In a related embodiment, FIG. 26 shows a lower or outer side perspective view of the protruding spacer 314, further showing an outer side of the inner ledge 2504.

Here has thus been described embodiments of the weed trimmer with collecting bag device, and methods related thereto, which can be employed in numerous modes of usage.

The many features and advantages of the multitude of embodiments of the weed trimmer with collecting bag are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A weed trimmer extension system for installation on a weed trimmer with a naked trimmer head, the weed trimmer extension system comprising:
    a. a cutting enclosure including an ejection aperture in a side of a rear end of the cutting enclosure;
    b. enclosure fasteners;
    c. a replacement cutting implement; further comprising a cutting blade, and at least one perpendicular fin, which is perpendicularly connected to the cutting blade, along a length of the cutting blade;
    d. a cutting implement fastener; and
    e. a protruding spacer;
    wherein the cutting enclosure is configured to be attached to the naked trimmer head of the weed trimmer with the enclosure fasteners, and the cutting blade is configured to be attached to a rotatable axle of the naked trimmer head via the cutting implement fastener, such that the cutting enclosure is configured to cover the cutting blade and the at least one perpendicular fin, above and to sides of the cutting implement, such that the cutting enclosure in combination with a rotation of the cutting blade and the at least one perpendicular fin is configured to create a substantially planar air vortex that propels cuttings, which are contained and directed by the cutting enclosure, and wherein the cuttings are ejected through the ejection aperture;
    wherein the cutting implement and the protruding spacer are configured to be mounted on the rotatable axle and tightened in place with the cutting implement fastener, such that the protruding spacer protrudes underneath the cutting implement, whereby the protruding spacer reduces a risk of close contact with the ground, whereby strength of the air vortex is reduced, and a risk of the cutting implement impacting ground during use is reduced.

2. The weed trimmer extension system of claim 1, wherein the cutting enclosure further comprises an ejection canal, such that the air vortex propels cuttings via the ejection canal from the cutting enclosure to the ejection aperture in the side of the cutting enclosure.

3. The weed trimmer extension system of claim 1, wherein an external protrusion of the protruding spacer is in a range of 0.5-2 inches.

4. The weed trimmer extension system of claim 1, further comprising a collection bag, wherein the collection bag is attached to the cutting enclosure, and wherein the cutting implement propels the cuttings, which are contained and directed by the cutting enclosure, through the ejection aperture and into the collecting bag.

5. The weed trimmer extension system of claim 4, wherein the collection bag further comprises at least one mesh screen, made of a mesh fabric that allows airflow, whereby air pressure is reduced when air enters the collection bag from the cutting enclosure during operation, whereby the mesh screen functions to avoid or reduce pressure accumulation in the collection bag, and allows a user to visually inspect the contents of cuttings in the collection bag.

6. The weed trimmer extension system of claim 1, further comprising a cutting disperser, wherein the cutting disperser is attached to the cutting enclosure, and the cutting implement propels cuttings, which are contained and directed by the cutting enclosure, through the ejection aperture and into the cutting disperser, which directs and disperses the cuttings to an area to a side of the weed trimmer extension system during operation.

7. The weed trimmer extension system of claim 1, wherein the ejection aperture is configured to be substantially at level with a plane of rotation of the replacement cutting implement.

8. The weed trimmer extension system of claim 1, wherein the at least one perpendicular fin further comprises at least one aperture.

9. The weed trimmer extension system of claim 1, wherein the protruding spacer further comprises:
   a. a spacer aperture, from a central part of an inner end to a central part of an outer end of the protruding spacer; and
   b. an inner ledge, which further comprises a central aperture;
   wherein the inner ledge is attached to the protruding spacer inside the spacer aperture, whereby the axle fits through the spacer aperture and the central aperture, and the cutting implement fastener is fastened against an outer side of the inner ledge, when the cutting implement fastener is fastened to the rotatable axle.

10. A weed trimmer extension system for installation on a weed trimmer with a naked trimmer head, the weed trimmer extension system comprising:
   a. a cutting enclosure including an ejection aperture in a side of a rear end of the cutting enclosure;
   b. a replacement cutting implement;
   c. enclosure fasteners;
   d. a protruding spacer; and
   e. a cutting implement fastener;
   wherein the cutting enclosure is configured to be attachable to the naked trimmer head of the weed trimmer with the enclosure fasteners, and the replacement cutting implement is configured to be attachable to a rotatable axle of the naked trimmer head, such that the cutting enclosure is configured to cover the rotatable replacement cutting implement, above and to sides of the cutting implement, such that the cutting enclosure in combination with a rotation of the replacement cutting implement is configured to create a substantially planar air vortex that propels cuttings, which are contained and directed by the cutting enclosure, and wherein the cuttings are ejected through the ejection aperture, wherein the cutting implement and the protruding spacer are configured to be mounted on the rotatable axle and tightened in place with the cutting implement fastener, such that the protruding spacer protrudes underneath the cutting implement, whereby the protruding spacer reduces a risk of close contact with the ground, whereby strength of the air vortex is reduced, and a risk of the cutting implement impacting ground during use is reduced.

11. The weed trimmer extension system of claim 10, wherein the replacement cutting implement further comprises a cutting blade, and at least one perpendicular fin, which is perpendicularly connected to the cutting blade, along a length of the cutting blade.

12. The weed trimmer extension system of claim 11, wherein the at least one perpendicular fin further comprises at least one aperture.

13. The weed trimmer extension system of claim 10, wherein the cutting enclosure further comprises an ejection canal, such that the air vortex propels cuttings via the ejection canal from the cutting enclosure to the ejection aperture in the side of the cutting enclosure.

14. The weed trimmer extension system of claim 10, wherein an external protrusion of the protruding spacer is in a range of 0.5-2 inches.

15. The weed trimmer extension system of claim 10, further comprising a collection bag, wherein the collection bag is attached to the cutting enclosure, and wherein the cutting implement propels the cuttings, which are contained and directed by the cutting enclosure, through the ejection aperture and into the collecting bag.

16. The weed trimmer extension system of claim 15, wherein the collection bag further comprises at least one mesh screen, made of a mesh fabric that allows airflow, whereby air pressure is reduced when air enters the collection bag from the cutting enclosure during operation, whereby the mesh screen functions to avoid or reduce pressure accumulation in the collection bag, and allows a user to visually inspect the contents of cuttings in the collection bag.

17. The weed trimmer extension system of claim 10, further comprising a cutting disperser, wherein the cutting disperser is attached to the cutting enclosure, and the cutting implement propels cuttings, which are contained and directed by the cutting enclosure, through the ejection aperture and into the cutting disperser, which directs and disperses the cuttings to an area to a side of the weed trimmer extension system during operation.

18. The weed trimmer extension system of claim 10, wherein the ejection aperture is configured to be substantially at level with a plane of rotation of the replacement cutting implement.

19. The weed trimmer extension system of claim 10, wherein the protruding spacer further comprises:
   a. a spacer aperture, from a central part of an inner end to a central part of an outer end of the protruding spacer; and
   b. an inner ledge, which further comprises a central aperture;
   wherein the inner ledge is attached to the protruding spacer inside the spacer aperture, whereby the axle fits through the spacer aperture and the central aperture, and the cutting implement fastener is fastened against an outer side of the inner ledge, when the cutting implement fastener is fastened to the rotatable axle.

* * * * *